(12) United States Patent
Rienmueller et al.

(10) Patent No.: US 11,198,480 B2
(45) Date of Patent: Dec. 14, 2021

(54) HEADLAMP WITH SENSOR

(71) Applicant: KTM AG, Mattighofen (AT)

(72) Inventors: Stephan Rienmueller, Kuchl (AT); Kremzer Zbynek, Lochen am See (AT)

(73) Assignee: KTM AG, Mattighofen (AT)

( * ) Notice: Subject to any disclaimer, the term of this patent is extended or adjusted under 35 U.S.C. 154(b) by 0 days.

(21) Appl. No.: 16/885,765

(22) Filed: May 28, 2020

(65) Prior Publication Data

US 2020/0377165 A1 Dec. 3, 2020

(30) Foreign Application Priority Data

May 29, 2019 (AT) ................ A 50497/2019

(51) Int. Cl.

| | |
|---|---|
| *B62J 6/00* | (2020.01) |
| *B62J 6/026* | (2020.01) |
| *F21S 45/47* | (2018.01) |
| *F21S 41/60* | (2018.01) |
| *F21V 21/10* | (2006.01) |
| *F21V 23/04* | (2006.01) |
| *F21W 102/13* | (2018.01) |

(52) U.S. Cl.
CPC .............. *B62J 6/026* (2020.02); *F21S 41/60* (2018.01); *F21S 45/47* (2018.01); *F21V 21/10* (2013.01); *F21V 23/0442* (2013.01); *F21W 2102/13* (2018.01)

(58) Field of Classification Search
CPC ..... B62J 6/02; B62J 6/022; B62J 6/026; B62J 6/027; F21S 45/47; F21S 41/60; F21V 21/10; F21V 21/14; F21V 23/0442; F21V 23/0492; F21W 2102/13
See application file for complete search history.

(56) References Cited

U.S. PATENT DOCUMENTS

| | | |
|---|---|---|
| 9,139,247 B2 | 9/2015 | Matsuoka |
| 10,166,909 B2 | 1/2019 | Suzuki et al. |
| 10,742,933 B2 | 8/2020 | Noguchi et al. |
| 2015/0015019 A1 | 1/2015 | Matsuoka |
| 2016/0241816 A1 | 8/2016 | Noguchi et al. |
| 2017/0327026 A1 | 11/2017 | Suzuki et al. |
| 2019/0257922 A1* | 8/2019 | McCord .................... B62J 6/022 |
| 2019/0283659 A1* | 9/2019 | Moerbe ...................... B62J 6/02 |
| 2021/0061388 A1* | 3/2021 | Maeda ................... F21S 41/141 |
| 2021/0061389 A1* | 3/2021 | Kawamura ............... B62J 99/00 |

FOREIGN PATENT DOCUMENTS

| | | |
|---|---|---|
| DE | 10 2016 223 761 | 5/2018 |
| EP | 2 824 022 | 1/2015 |
| EP | 3053818 | 8/2016 |
| EP | 3243731 | 11/2017 |
| JP | 2015-123840 | 7/2015 |
| JP | 2017-039487 | 2/2017 |
| JP | 2019-039759 | 3/2019 |
| WO | 2018/043485 | 3/2018 |
| WO | 2019/039051 | 2/2019 |
| WO | 2019/224957 | 11/2019 |

* cited by examiner

*Primary Examiner* — Y M. Quach Lee
(74) *Attorney, Agent, or Firm* — Wenderoth, Lind & Ponack, L.L.P.

(57) ABSTRACT

A motorcycle headlamp includes a carrier, a light fixture mounted on the carrier, and at least one sensor for detecting features of an area lying in front of the motorcycle in the direction of travel. An opening is provided in the carrier, and the sensor can be arranged in the opening.

27 Claims, 9 Drawing Sheets

HEADLAMP WITH SENSOR

BACKGROUND OF THE INVENTION

The invention relates to a motorcycle headlamp with a carrier and at least one light fixture mounted on the carrier and at least one sensor, in which the sensor is formed for the detection of features of an area lying in front of the motorcycle in the direction of travel. The invention furthermore relates to a motorcycle with such a motorcycle headlamp. The invention furthermore relates to a motorcycle with a frame and a motorcycle headlamp, in which the motorcycle headlamp has at least one light fixture and a carrier, on which the light fixture is mounted, and at least one sensor, which is formed for the detection of features of an area lying in front of the motorcycle in the direction of travel. The at least one sensor is fastened to a supporting element and a bracket fastened to the frame is provided, on which the motorcycle headlamp and the supporting element are mounted together.

Modern vehicles have a range of assistance systems which, for one thing, increase driving comfort and, for another, support the driver and thereby make a considerable contribution to greater traffic safety. A necessary prerequisite for the functioning of such assistance systems is the possibility to detect the surroundings of the vehicle and/or the status of the vehicle using sensors. The data obtained in this way are evaluated by a computer in the vehicle. In the case where the computer regards a situation of the surroundings or a vehicle status as problematic or critical, a warning signal is emitted or an intervention is made in the operation of the vehicle, for instance by the vehicle automatically triggering a braking procedure.

In the case of passenger cars, it is relatively easy to accommodate the sensors necessary for the detection of the surroundings. The central area above the rear-view mirror behind the windscreen lends itself in particular to this. Likewise, it is usual to attach these sensors in or underneath the radiator grille. In the case of motorcycles, the arrangement of the sensors necessary for the detection of the surroundings is much more difficult since, for one thing, there is much less space available in the front area. For another thing, because of the inclined positions during cornering, motorcycles perform much greater changes in their alignment in relation to the road surface than passenger cars, with the result that much greater forces act on the sensors and their fastening devices. This is particularly true for trail motorcycles, which are often ridden on unsurfaced roads.

For this purpose, in published documents WO 2018/043, 485 A1 and WO 2019/039,051 A1, motorcycles are shown, which have sensors which are positioned in the motorcycle headlamp and thus favourably per se. Because of the arrangement of the sensors on the underside of the headlamp housing or on the top of the printed circuit board provided to supply the lamp, in the specific case the detection of the surroundings is not complete, however. In addition, these sensors are partially exposed to the radiation field of the light fixtures, are therefore dazzled by the light fixtures, which has a negative effect on the data acquisition of the sensors, in particular in the case of optical sensors. Moreover, the sensors shown in these published documents cannot be fastened stably because of their positioning and are in danger of not withstanding the stresses resulting during motorcycling. This is true in particular for the motorcycle disclosed in EP 2,824,022 A1, in which the sensor is additionally arranged outside the actual headlamp.

SUMMARY OF THE INVENTION

The object of the present invention is therefore to provide a motorcycle with at least one sensor for the detection of features of an area lying in front of the motorcycle in the direction of travel. The sensor is arranged favorably in relation to the height above the road surface, and the arrangement of the sensor requires little space, and can therefore be used for the arrangement of other components. It is also to be ensured that the sensor can detect an adequate area in front of the motorcycle even in the case of positional changes of the motorcycle. For another thing, the sensor is to be able to be fastened stably and protected from external influences. In particular, the sensor is to be influenced as little as possible by the radiation and heat field of the light fixtures, in order to guarantee an acquisition of data that is continuous and as error-free as possible.

The motorcycle headlamp according to the invention and the motorcycle headlamp of the motorcycle according to the invention have one or more light fixtures for illuminating and lighting up an area lying in front of the motorcycle in the direction of travel. The motorcycle headlamp is thus a front headlamp. The light fixtures can contain different light-emitting elements, in particular light-emitting elements for a daytime running light, a cornering light, a dipped beam and/or a full beam. In addition, the light fixtures can also contain a light-emitting element for an indicator. Devices known per se in the state of the art are used as light sources for the light-emitting elements, such as e.g. LEDs, xenon or halogen light sources.

The motorcycle headlamp further has a carrier, on which at least one light fixture is mounted. A light fixture contains some of the light-emitting elements, such as for instance the light-emitting elements for full beam and dipped beam, and this light fixture is mounted on the carrier, while the light fixtures for the other light-emitting elements are not mounted on the carrier. Alternatively, the light fixture mounted on the carrier can also include all of the light-emitting elements provided. Several light fixtures can also be provided for the individual light functions, for example two light fixtures for full beam, two light fixtures for dipped beam, etc., and in each case both or in each case only one light fixture can be mounted on the carrier.

The at least one sensor is formed for the detection of features of an area lying in front of the motorcycle in the direction of travel. The "area" as used herein means both the immediate surroundings of the motorcycle in front of the motorcycle and laterally in front of the motorcycle, thus to the right in front of the motorcycle and to the left in front of the motorcycle, in the direction of travel as well as further-extended areas in front of the motorcycle and laterally in front of the motorcycle in the direction of travel. For example, sensors can be used which can detect areas with an extension of up to a kilometre.

Depending on which features are detected by the sensor, different sensors are used. For example, the sensor can be formed such that the distance and optionally also the speed of objects which are located in front of the motorcycle seen in the direction of travel are detected. Thus, for instance, the distance from a vehicle travelling in front of the motorcycle and optionally its speed can be determined. The distance from a stationary object can also be detected. The sensors provided for the respective feature to be detected are known per se in the state of the art. For example, they can be radar sensors, wherein the frequency of the radiation emitted by such radar sensors usually lies in the range between 76 and 77 GHz.

So-called LIDAR sensors can also be used for the invention. LIDAR sensors operate with a radiation in the infrared range, in order to detect distances and speeds of objects. Further, so-called LADAR sensors can be used for the invention. LADAR sensors use laser radiation for the measurement of distance and speed.

Depending on the radiation angle, not only areas in front of the motorcycle, seen in the direction of travel, but also lateral areas can be detected by the sensors, whereby it is possible to recognize and to detect vehicles or pedestrians which are moving towards the road from the right or the left. The detection area can be symmetrical but also asymmetrical.

The feature detected by the sensor can be supplied to a computer and analyzed there. On the basis of stored data, a riding situation is classified as problematic or critical depending on the detected feature, e.g., too short a distance from a vehicle travelling in front of the motorcycle. In the process, data relating to the vehicle status, such as speed, angle of inclination of the motorcycle and more like this can also be taken into consideration. A signal-generating device, preferably a display, which is actuated by one or also by several computers can be provided, in order to emit a warning signal. Depending on the situation, the computer can also actuate a control unit, with which an intervention is made in the operation of the vehicle, for example by initiating emergency braking.

Sensors in the form of cameras which are formed to capture visible light or thermal radiation can also be used for the invention. Such sensors can, for one thing, acquire an image of the surroundings and supply it to a computer. The computer can be formed to identify the detected objects and to assess a riding situation as problematic or critical on the basis of this identification. Objects can also be identified by a thermal imaging camera. In particular, such sensors can detect people or animals in the dark. In addition, the status of the road surface in front of the motorcycle can be detected using an optical camera or a thermal imaging camera, in order to determine a critical or problematic situation after evaluation by a computer. By emitting a warning signal, a pothole, ice or another slippery road surface can thus be indicated, for example. Acoustic sensors or ultrasonic sensors can also be used for the invention.

Sensors with which the distance from an object located in front of the motorcycle, and optionally its speed, is determined can be used as a component part of an active cruise control. Such a system is also known as Adaptive Cruise Control (ACC).

The sensor can also be formed to detect several different types of features. It can also be provided to use several sensors.

The fact that the at least one sensor can be arranged in the opening of the carrier means that the at least one sensor is arranged in the opening in the mounted state of the motorcycle headlamp. The at least one sensor can thereby be arranged in the motorcycle headlamp and thus be ideally positioned in relation to the height above the road surface, since the positioning of the headlamp is also selected according to these points of view. In addition, through an arrangement and thus an integration in the headlamp, no space outside the headlamp which can be used for other components is utilized for the sensor. The sensor can be fastened for example to the housing or to the frame of the headlamp. In the process, those areas of the carrier which form the opening in which the at least one sensor can be arranged, and is arranged in the mounted state of the motorcycle headlamp, provide protection from external influences and also serve to isolate the sensor from the radiation field which is radiated by the light fixture mounted on the carrier. It can thereby be achieved that the sensor is influenced as little as possible and not dazzled by the at least one light fixture mounted on the carrier, which means that a constant acquisition of data is guaranteed. In particular, with a carrier made from metal, the areas of the carrier forming the opening can represent a heat shield against the heat generated by the light fixture.

The arrangement of the sensor in the opening means that the sensor field in which the data are acquired, for example a photodetector field or an optical lens, is largely or wholly arranged within the opening.

In many motorcycles, the front headlamp is moved together with the handlebars when cornering. When the sensor is arranged in the opening of the carrier of the motorcycle headlamp, in addition to the motorcycle headlamp, the carrier and thus the sensor are also moved with it, with the result that the road surface and thus the area relevant for the assessment of the dangerous situation are automatically detected.

In an embodiment of the invention, the at least one sensor is fastened to the carrier. This results in a particularly advantageous and stable positioning of the sensor, since the light fixture is optimally placed to light up an area lying in front of the motorcycle and the carrier is a very stable component.

The carrier of the motorcycle headlamp is a device on which at least one light fixture is mounted. The frame and/or the housing of the headlamp can be formed as a component part of the carrier, wherein frame and/or housing can be fixedly or also releasably connected to the carrier.

In an embodiment of the invention, a supporting element is provided, to which the at least one sensor is fastened, wherein the supporting element is formed as a component part of the carrier. For example, a specific area of the opening of the carrier is formed as a supporting element, by providing a holding means for fastening the sensor there.

Alternatively, the supporting element is fastened to the housing of the headlamp and/or to the frame of the headlamp and/or to the carrier, and the supporting element is formed as a separate component from the carrier. For example, the supporting element can be formed as a separate frame, which is fastened to the carrier of the light fixture and/or to the housing and/or to the frame of the headlamp by detachable fastening means. It is also possible for the supporting element to be non-detachably fastened to the carrier and/or to the housing and/or to the frame of the headlamp, for example by welding or bonding the supporting element to the carrier and/or to the housing and/or to the frame of the headlamp.

In the case of the motorcycle according to the invention, a supporting element is provided for fastening the at least one sensor, wherein the supporting element and the motorcycle headlamp are mounted together on a bracket which is fastened to the frame of the motorcycle according to the invention. Also, in this case, a favorable positioning above the road surface can result.

This is true in particular for an embodiment of the invention in which the carrier, on which at least one light fixture of the motorcycle headlamp is mounted, and the supporting element, to which the sensor is fastened, are mounted together on the bracket fastened to the frame.

This advantage also results when the sensor is fastened to a supporting element which, together with the headlamp, in particular together with the carrier on which the light fixture is mounted, are mounted on a bracket which is fastened to the frame. Such a bracket can be, for example, a supporting mask which is fastened to the frame, e.g. by rubber loops. By mounting the supporting element and the headlamp, in particular the carrier to which at least one light fixture is fastened, together on a bracket the sensor can be mounted in close proximity to the motorcycle headlamp, even if the sensor is not fastened directly to the motorcycle headlamp. Also in this case, little space is used up. In addition, the sensor is mounted at a favourable height in relation to the road surface.

When the sensor is arranged in the opening of the carrier, in particular when it is fastened to the carrier, or when the supporting element to which the sensor is fastened is formed as a component part of the carrier, because of the common mounting with the headlamp, the sensor is mounted in a particularly vibration-damped manner and decoupled from other vibrations, which has a favorable effect on the detection of features by the sensor.

Vibration damping is also possible in the case of fastening to a supporting element which is mounted on a bracket together with the headlamp, in particular if the supporting element is connected to the headlamp for instance via a fastening means.

In an embodiment of the invention, the carrier has two carrier legs, wherein the opening is formed by the area between the carrier legs. The carrier legs can be provided at an upper and/or a lower end of the carrier. This results in a particularly space-saving and above all stable fastening of the sensor, and the sensor is particularly well protected by the carrier legs from influences of the light fixture. This applies both to the function as heat shield and as glare shield against the radiation field of the light fixture. The carrier can be fork-shaped. In one embodiment, the sensor can be fastened directly or indirectly to the carrier legs.

These advantages also result in another embodiment of the invention, in which the carrier has an annular area which borders the opening in which the sensor can be arranged. Here, the sensor can be protected from all sides by the carrier.

In a further embodiment of the invention, a plurality of light fixtures mounted on the carrier is provided, wherein the carrier has a longitudinal direction and a bar-shaped section aligned in the longitudinal direction, and in each case at least one light fixture is mounted on the carrier on both sides of the bar-shaped section. In the normal operating state of the motorcycle, the longitudinal direction of the carrier can be aligned vertically or alternatively also horizontally. In particular, if the opening of the carrier is formed at an upper and/or a lower end of the bar-shaped section, this results on the one hand in a symmetrical distribution of light by the light fixtures arranged on both sides, and on the other hand in particularly good protection for the sensor arranged in the opening formed between the carrier legs.

In an embodiment of the invention, the headlamp, in particular the carrier, has a cooling element for cooling the light fixture, and the sensor is fastened to the cooling element. If a supporting element is provided, to which the sensor is fastened, the supporting element can alternatively be fastened to the cooling element. In order to achieve as comprehensive a cooling as possible, the cooling element for the light fixture is often arranged centrally in the headlamp. By fastening the sensor or the supporting element with the sensor to the cooling element, a central position is thus available for the sensor without using much space, which would be needed for other components. A compact construction is thus possible for the motorcycle headlamp according to the invention.

In an embodiment of the invention, the sensor is mounted movable relative to the headlamp, in particular relative to the carrier. Because of the sensitivity of the sensor, particular attention must be paid to the adjustment of the sensor. Because the sensor, or the supporting element to which the sensor is fastened, is mounted movable relative to the headlamp, in particular relative to the carrier, an adjustment is possible separately from the headlamp and the light fixture. Thus, adjustment of the sensor can be carried out by the factory or by a specialist company, while the less sensitive adjustment of the headlamp, which is to be carried out more frequently, can be carried out by usual repair workshops or by the rider themselves.

In an embodiment of the invention, a common cover is provided for the at least one sensor and the at least one light fixture mounted on the carrier. The sensor can thereby be protected from external influences without a separate device being necessary. The cover is at least partly transparent, wherein glass or a plastic is often used as material. However, depending on the sensor used, it can also be provided that the area of the cover arranged above the sensor is designed non-transparent for light of the visible spectrum.

In an embodiment of the invention, the headlamp has an imaginary plane of symmetry. This can be a plane which, in the normal state of use of the motorcycle, thus when the motorcycle is not being ridden in an inclined position, is arranged vertically with respect to the ground and, seen in the longitudinal direction, runs centrally through the motorcycle. Alternatively, it can be a plane which is arranged horizontally in the normal state of use of the motorcycle. The imaginary plane of symmetry can be arranged in the bar-shaped section of the carrier, wherein light fixtures are provided on both sides of the bar-shaped section, which are likewise arranged symmetrically in relation to the imaginary plane of symmetry, which results in a particularly symmetrical distribution of light. In the mounted state, the sensor intersects the imaginary plane of symmetry, thereby resulting in a central position in relation to the headlamp.

Furthermore, the sensor can also have an imaginary plane of symmetry, wherein, in the mounted state, the imaginary plane of symmetry of the sensor coincides with the imaginary plane of symmetry of the headlamp. The sensor is thus mounted symmetrically in relation to the imaginary plane of symmetry of the headlamp, which results in a particularly central position of the sensor in relation to the headlamp.

Through the opening provided according to the invention, the sensor can be arranged between upper and lower boundary edges of the headlamp as well as between right and left boundary edges of the headlamp, which results in a particularly small space requirement for the sensor. In addition, the recess can be arranged symmetrically in relation to an imaginary plane of symmetry of the headlamp, wherein a particularly central positioning for the sensor results at the same time as saving space.

BRIEF DESCRIPTION OF THE DRAWINGS

Further advantages and details of the invention are discussed for different embodiment examples with reference to the following figures in which.

DETAILED DESCRIPTION OF THE INVENTION

Figure 1:
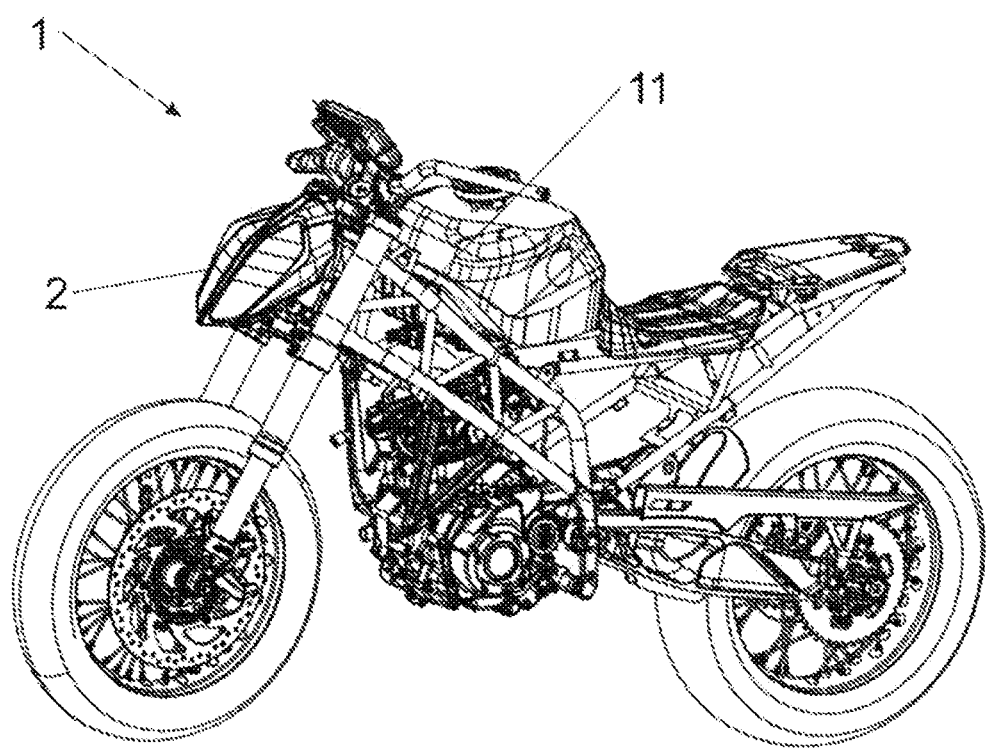
FIG. 1 is a schematic perspective representation of a motorcycle according to the invention.

FIG. 1 shows a perspective representation of a motorcycle 1 according to the invention with a frame 11 in the form of a tubular trellis frame with upper and lower tubes. Mounted on the front of the motorcycle 1 is a motorcycle headlamp 2, which has a sensor 5, not visible in this drawing, for the detection of features of an area 7 lying in front of the motorcycle 1 in the direction of travel (see FIG. 2).

Figure 2:
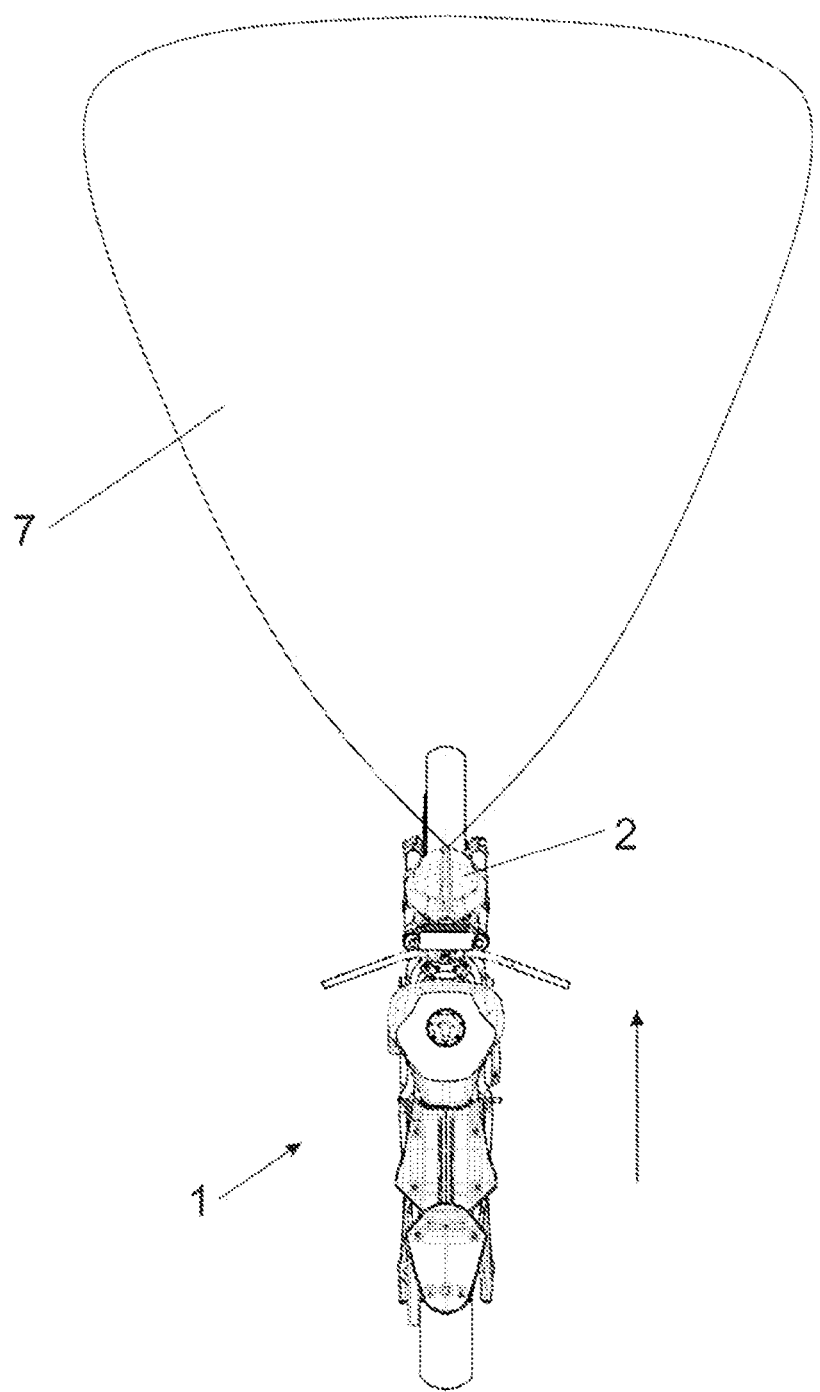
FIG. 2 is a representation of the detection area of a sensor.

FIG. 2 shows a top view of the motorcycle 1, wherein the area 7 detected by the sensor 5 can be seen and lies in front of the motorcycle 1 in the direction of travel indicated by the arrow. The area represented is not to scale. It is conceivable, for example, that the area 7 reaches several hundred metres in front of the motorcycle 1. A speed-dependent design of the detection area 7 is also conceivable. In this case, the area 7 is designed symmetrically. However, an asymmetrical detection area 7 is also conceivable, depending on the feature to be detected.

The sensor 5 is formed to detect features inside this area 7, for example distance and speed of a vehicle travelling in front of the motorcycle 1 inside this area 7. Through transmission of the data acquired by the sensor 5, for one thing a signal-generating device, for example a display, can be actuated to generate a warning signal. For another thing, it would also be possible to actuate an ACC device (Adaptive Cruise Control), whereby accelerator and brake are controlled automatically in order to stop the motorcycle 1 in a particular distance range behind the vehicle in front.

Figure 3:
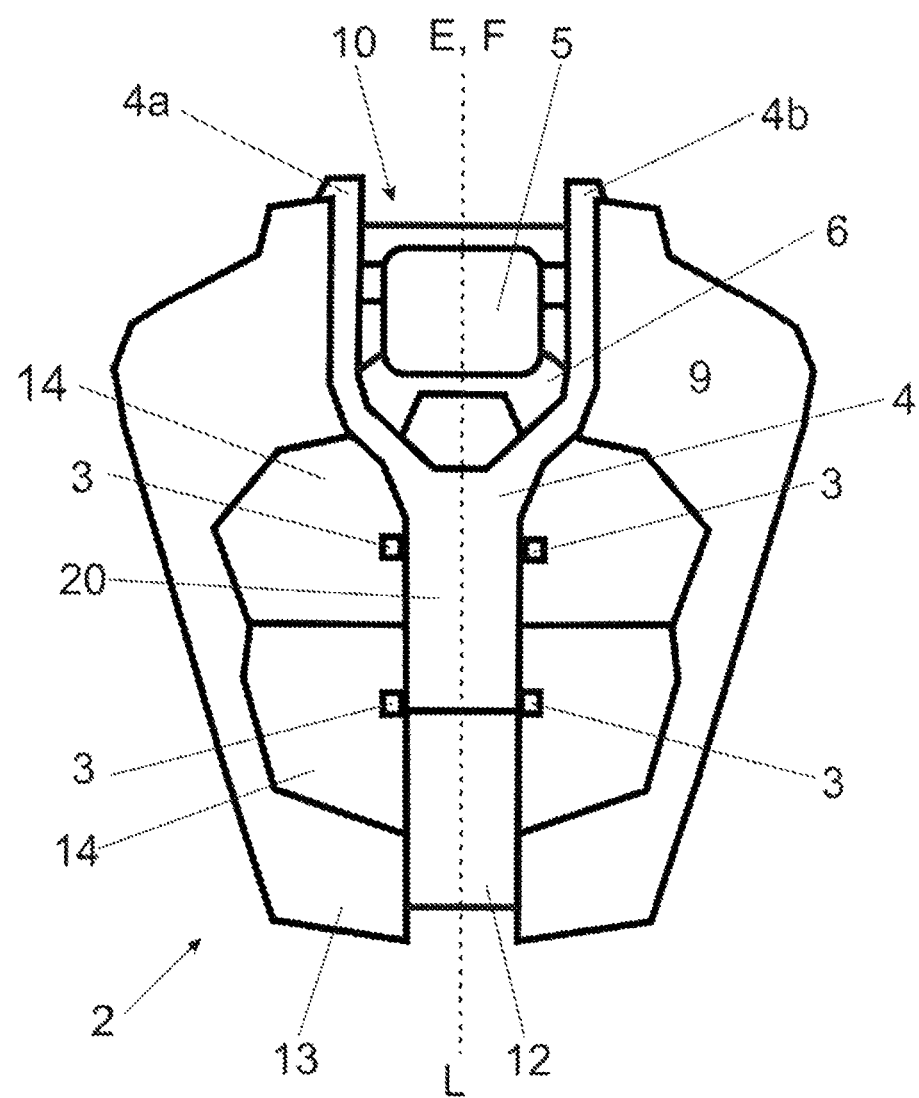
FIG. 3 is a schematic front view of an embodiment of a headlamp according to the invention.

FIG. 3 shows a front view of an embodiment of a headlamp 2 according to the invention, in which the sensor 5 is arranged. In this embodiment example, the headlamp 2 has a carrier 4, having a longitudinal direction L, to which several (schematically represented) light fixtures 3 are fastened on both sides of a bar-shaped section 20. The carrier 4 can be manufactured from metal, for example aluminium, and thereby serve as cooling element in order to emit the heat forming during operation of the light fixture 3. The carrier 4 is mounted on a bracket 12, which itself is fastened to the frame 11. A transparent cover 9 protects both the light fixtures 3 and the sensor 5.

In the upper area, the carrier 4 has the carrier 4 has two carrier legs 4a, 4b which form an opening 10 in which the sensor 5 fastened to a supporting element 6 is arranged. The carrier 4 is thus formed fork-shaped, wherein the sensor 5 arranged between the carrier legs 4a, 4b is well protected by the carrier legs 4a, 4b from radiation or heat influences due to the light fixtures 3. The sensor field of the sensor 5 is wholly arranged within the opening 10. In this embodiment, the supporting element 6 is firmly connected to the carrier 4, for example by a welded joint. It would also be possible in principle to connect the sensor 5 directly to the carrier 4, for example by bonding or likewise welding the sensor 5 to the carrier.

Furthermore, the headlamp 2 has reflectors 14 arranged on both sides of the carrier 4, and the reflectors 14 are part of the light fixtures 3 and deflect the light emitted by the light-emitting elements of the light fixtures 3 in the direction of travel. Instead of these reflectors 14, it would also be possible to design the light-emitting elements of the light fixtures 3 to be extensive. The light-emitting elements of the light fixtures 3 and the optionally provided reflectors 14 are devices known per se in the state of the art. Furthermore, a housing 13, which is likewise connected to the light-emitting elements of the light fixtures 3 and optionally the reflectors 14, is fastened to the carrier 4.

The headlamp 2 has an imaginary plane of symmetry E, arranged vertically in the normal operating state of the motorcycle, in which the longitudinal direction L of the carrier 4 is arranged. The sensor 5 also has an imaginary plane of symmetry F which, in the mounted state, coincides with the imaginary plane of symmetry E of the headlamp 2. This results in a central and symmetrical position for the sensor 5, which has favourable effects for the detection area 7.

Figure 4:
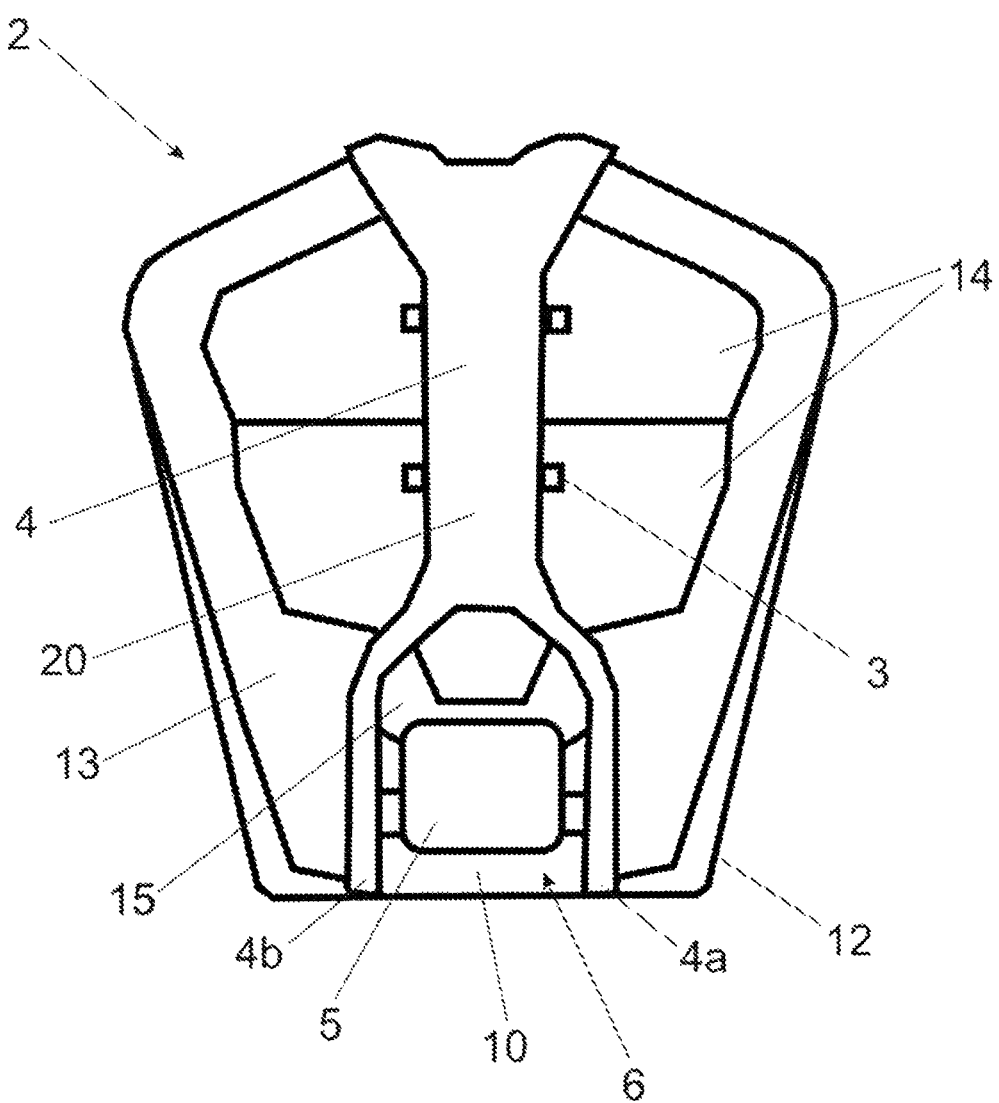
FIG. 4 is a schematic front view of a further embodiment of a headlamp according to the invention.

A front view of a further embodiment of a headlamp 2 according to the invention with an integrated sensor 5 is represented in FIG. 4. This embodiment differs from the embodiment represented in FIG. 3 above all in that, in the lower area, the carrier 4 has carrier legs 4a, 4b which form the opening 10 in which the sensor 5 is arranged. The headlamp 2 again has an imaginary plane of symmetry E which, in the operating state of the motorcycle 1, is arranged vertically and which coincides with the imaginary plane of symmetry F of the sensor 5 in the mounted state. The carrier 4 is thus formed fork-shaped, wherein the sensor 5 arranged between the carrier legs 4a, 4b is well protected by the carrier legs 4a, 4b from radiation or heat influences due to the light fixtures 3. The sensor field of the sensor 5 is wholly arranged within the opening 10.

Figure 5:
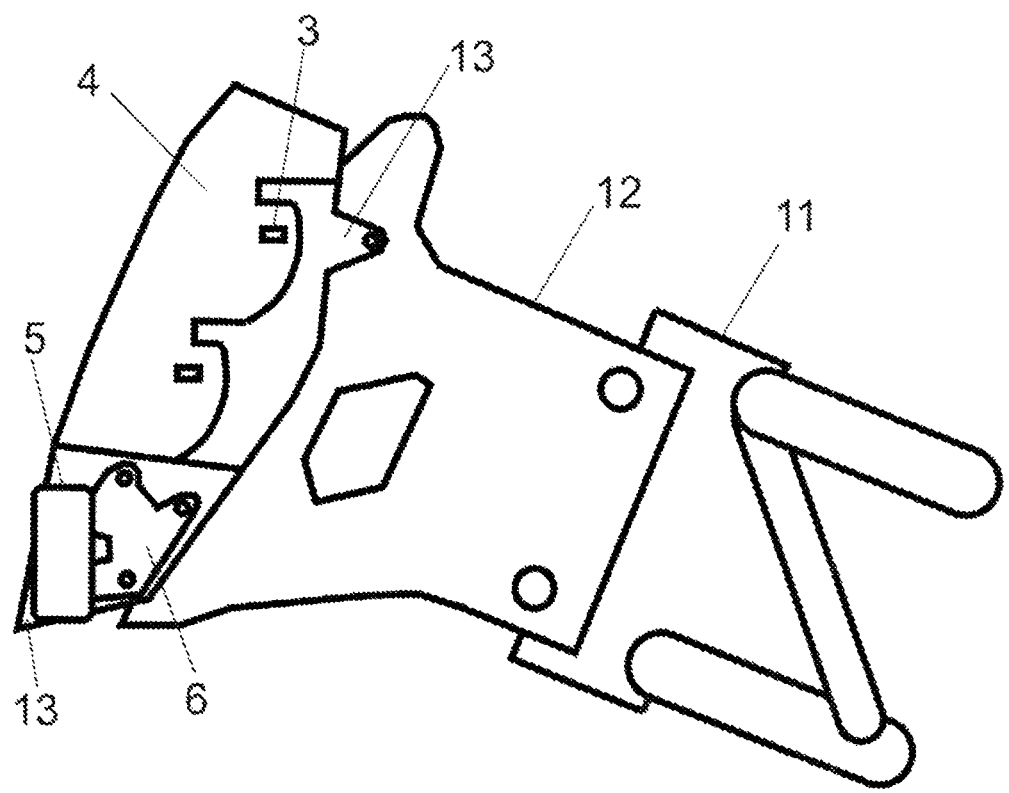
FIG. 5 is a schematic side view of a further embodiment of a headlamp according to the invention.

As can be seen with reference to the side view of FIG. 5 pertaining to FIG. 4, in the embodiment of the headlamp 2 represented in FIGS. 4 and 5, the supporting element 6, to which the sensor 5 is fastened, is fastened to the housing 13 of the headlamp 2 via a supporting element 6. The supporting element 6 has an adjustment device, by which the sensor 5 is mounted movable relative to the carrier 4. An adjustment of the sensor 5 is thereby possible independently of the adjustment of the light fixture 3. The carrier 4 is connected via the housing 13 to a bracket 12, which itself is fastened to the frame 11.

Figure 6:
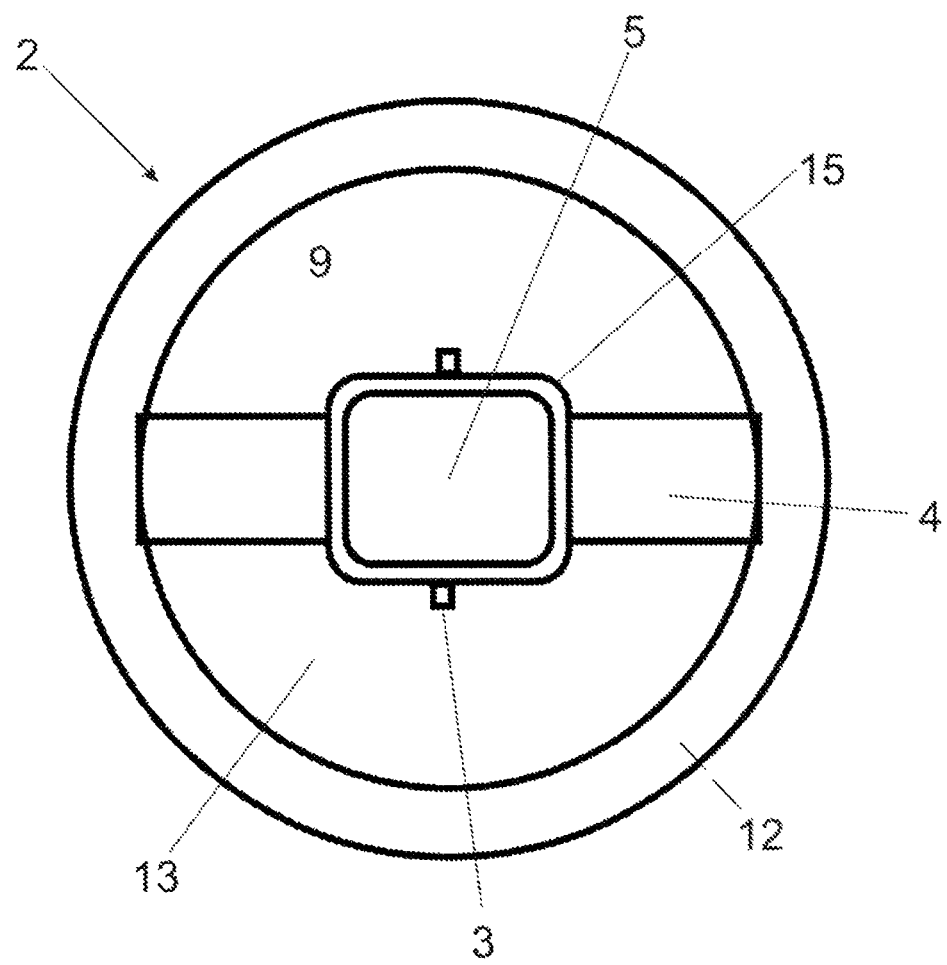
FIG. 6 is a schematic front view of a further embodiment of a headlamp according to the invention.

FIG. 6 shows a further embodiment of a headlamp 2 according to the invention in a schematic front view. In this embodiment example, the carrier 4 has an annular section 15, in which the sensor 5 is fastened to the carrier 4 and is thus particularly well protected. The sensor field of the sensor 5 is wholly arranged within the annular border 15. In this embodiment example, the schematically represented light-emitting elements of the light fixture 3 are arranged on the housing 13 and next to the carrier 4 and the sensor 5. The housing 13 is connected to the carrier 4. However, the light fixture or fixtures 3 or the light-emitting elements can also be fastened directly to the carrier 4. The light-emitting elements can also occupy larger areas of the housing 13. The housing 13 is fastened to a bracket 12, which itself is mounted on the frame 11 of the motorcycle 1. The headlamp 2 again has an imaginary plane of symmetry E which, in the operating state of the motorcycle 1, is arranged vertically and coincides with the imaginary plane of symmetry F of the sensor 5.

Figure 7:
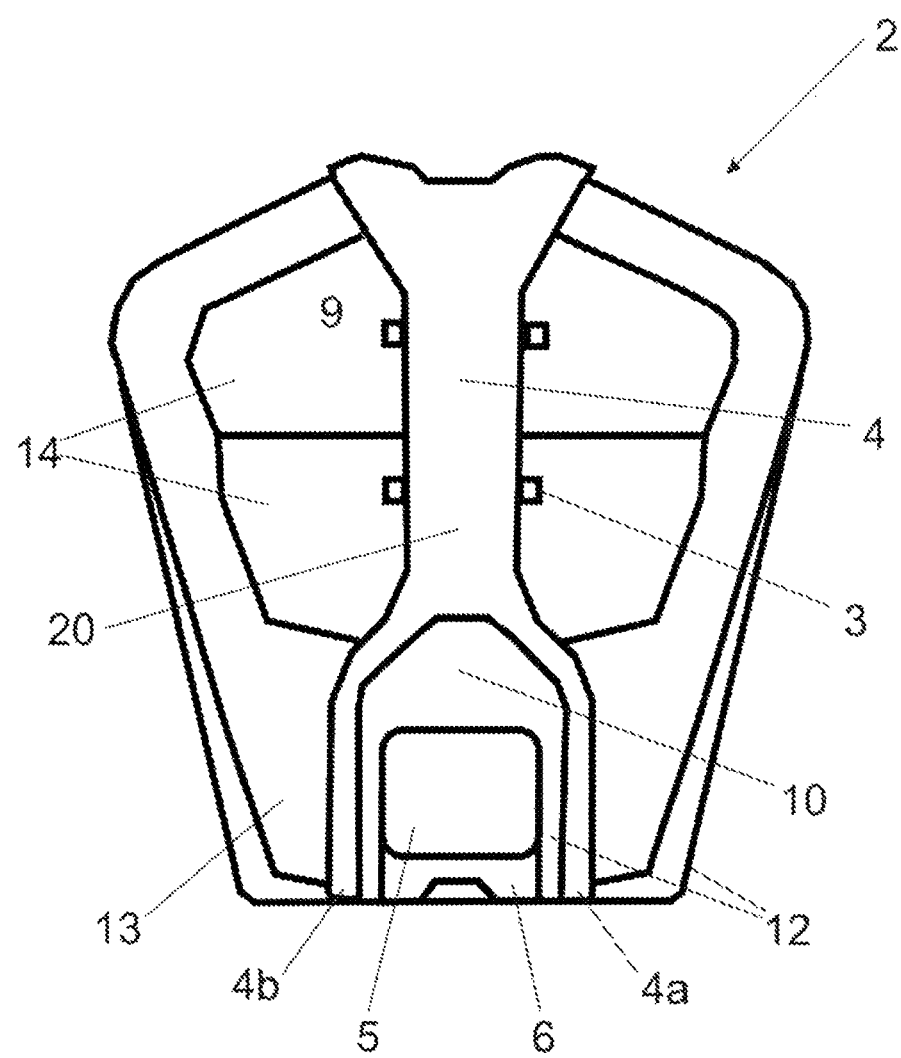
FIG. 7 is a schematic front view of a further embodiment of a headlamp according to the invention.

In FIG. 7, a further embodiment of a headlamp 2 according to the invention is represented in a schematic front view. Large parts of this headlamp 2 correspond to the embodiment represented in FIGS. 4 and 5. However, in this embodiment, the supporting element 6 of the sensor 5 is not connected via the housing 13 or directly to that part of the carrier 4 to which the light fixtures 3 are fastened. A transparent cover 9 protects both the light fixtures 3 and the sensor 5, arranged protected in the opening 10, the sensor field of which is wholly arranged within the opening 10.

Figure 8:
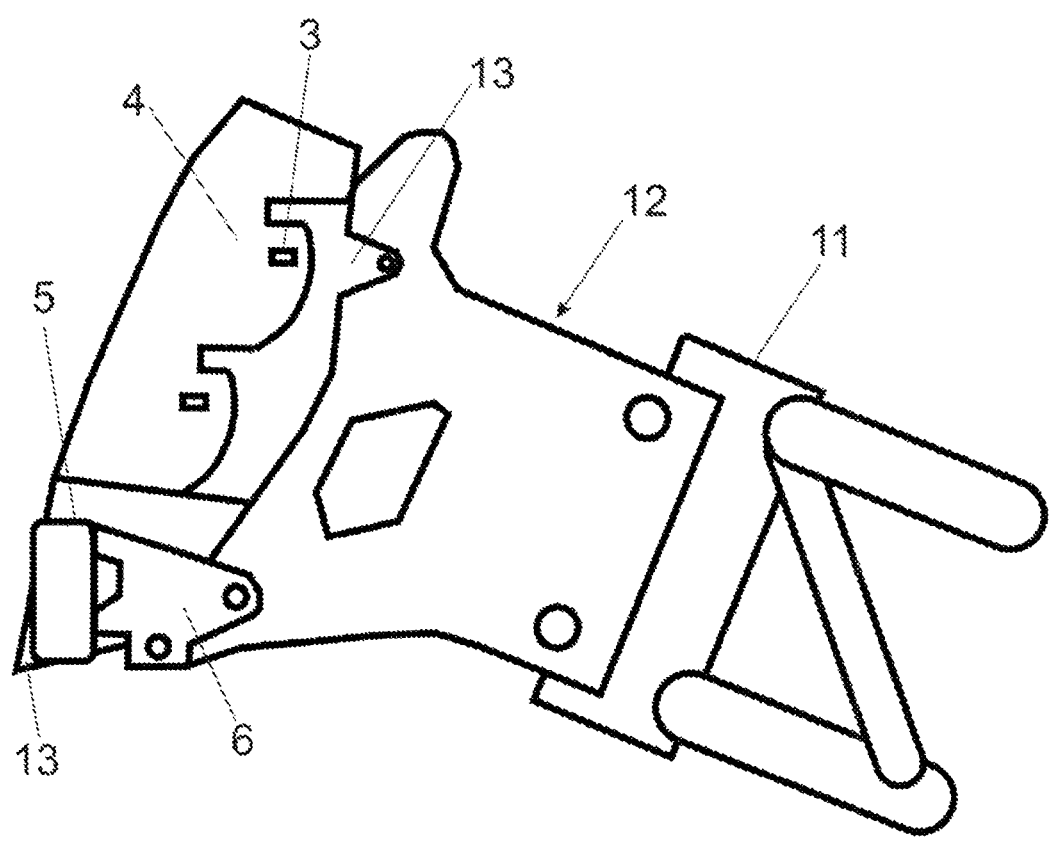
FIG. 8 is a schematic side view of a further embodiment of a headlamp according to the invention.

Again, with reference to the side view of FIG. 8 pertaining to FIG. 7, it can be seen that the sensor, arranged in a recess 10 of the carrier 4, is mounted on a supporting element 6 which is mounted on a bracket 12, which itself is fastened to the frame 11. In this embodiment, the carrier 4 is therefore connected to the bracket 12 via the housing 13, while the sensor 5 is fastened to the bracket 12 separately via the supporting element 6. The supporting element 6 and the headlamp 2 are thus mounted together on the bracket 12. An adjustment device is provided, with which the sensor 5 can be adjusted independently of the light fixture 3.

Figure 9:
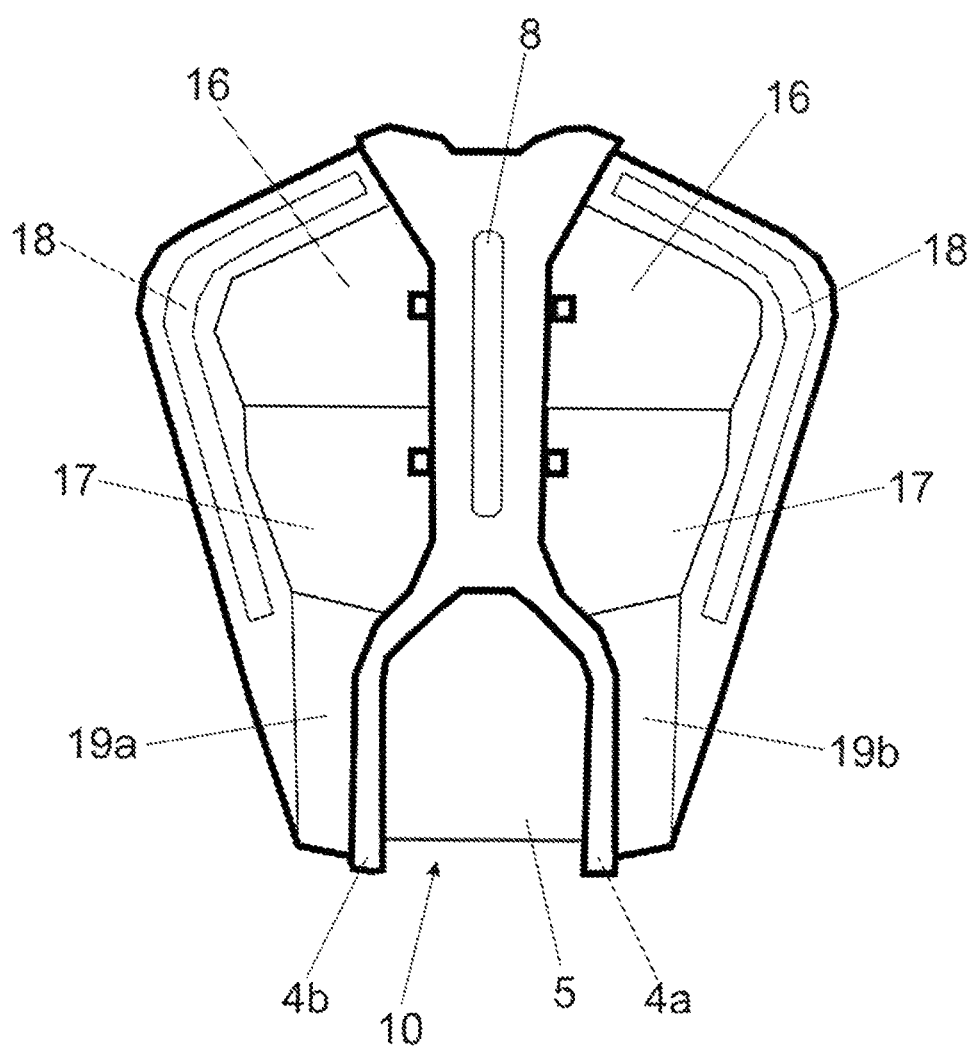
FIG. 9 is a schematic front view of a further embodiment of a headlamp according to the invention.

In FIG. 9, a further embodiment of a headlamp 2 according to the invention is represented in a schematic front view. The carrier 4 is made from metal and has a cooling element 8 in the form of a cooling fin on its front surface. In the lower area of the carrier 4, an opening 10 is provided between the carrier legs 4a, 4b of the fork-shaped carrier 4, in which a sensor 5 is arranged. In this embodiment, the sensor 5 is fastened directly to the carrier legs 4a, 4b, for example by bonding or welding the sensor 5 to the carrier walls.

On both sides, thus in the represented case to the left and right of the bar-shaped section 20 of the carrier 4, light fixtures 3 are fastened, which contain different light-emitting elements, namely light-emitting elements 17 for the full beam and light-emitting elements 16 for the dipped beam. Outside and above the light-emitting elements 16, 17, the light fixtures 3 contain further light-emitting elements 18 for the daytime running light. To the right and left of the opening 10, light-emitting elements 19a and 19b for the right and the left cornering light are arranged. The sensor 5 is nevertheless well protected by the carrier 4 from the influence of the light-emitting elements 19a, 19b since the sensor field of the sensor 5 is wholly arranged within the opening 10. The light-emitting elements form light fixtures 3 to the left and right of the carrier and are fastened both to the carrier 4 and to the housing 13, which represents a part of the carrier 4 and is connected to the carrier 4. A transparent cover 9 protects the light fixture 3 and the sensor 5. It can clearly be seen that the sensor 5 is well protected overall by the carrier legs 4a, 4b from being dazzled by the light-emitting elements.

LIST OF REFERENCE NUMBERS 1 motorcycle
2 motorcycle headlamp
3 light fixture
4 carrier
4a, 4b carrier legs
5 sensor
6 supporting element
7 area in front of the motorcycle
8 cooling element
9 cover
10 opening
11 frame
12 bracket
13 housing
14 reflectors
15 annular section
16 dipped beam
17 full beam
18 daytime running light
19a right cornering light
19b left cornering light
20 bar-shaped section
E plane of symmetry of the light fixture
F plane of symmetry of the headlamp
L longitudinal direction of the carrier

The invention claimed is:

1. A motorcycle headlamp comprises:
a carrier;
a light fixture mounted on the carrier; and
a sensor configured to detect features of an area lying in front of the motorcycle in the direction of travel; and
a supporting element to which the sensor is fastened, the supporting element being configured to be fastened to a housing of the motorcycle headlamp or to a frame of the motorcycle headlamp or to both to the housing and to the frame of the motorcycle headlamp; and
a cooling element to which the supporting element is fastened,
wherein the carrier has an opening configured to allow the sensor to be arranged in the opening.

2. The motorcycle headlamp according to claim 1, wherein the sensor is fastened to the carrier.

3. The motorcycle headlamp according to claim 1, further comprising a supporting element to which the sensor is fastened, and the supporting element is configured to be fastened to the carrier or is formed as a component part of the carrier.

4. The motorcycle headlamp according to claim 1, wherein the carrier has two carrier legs and the opening is formed as a space between the carrier legs.

5. The motorcycle headlamp according to claim 1, wherein the carrier has an annular area which borders the opening.

6. The motorcycle headlamp according to claim 1, wherein the light fixture is one of a plurality of light fixtures mounted on the carrier, the carrier has a longitudinal direction and a bar-shaped section aligned in the longitudinal direction, and at least one of the plurality of light fixtures is mounted on the carrier on each side of the bar-shaped section.

7. The motorcycle headlamp according to claim 1, further comprising a cooling element to which the sensor is fastened.

8. The motorcycle headlamp according to claim 1, wherein the sensor is movably mounted relative to the carrier.

9. The motorcycle headlamp according to claim 1, wherein the supporting element is movably mounted relative to the carrier.

10. The motorcycle headlamp according to claim 1, further comprising a common cover for the sensor and the light fixture mounted on the carrier.

11. The motorcycle headlamp according to claim 1, wherein the motorcycle headlamp is formed to have at least one imaginary plane of symmetry, and wherein the sensor intersects the imaginary plane of symmetry.

12. The motorcycle headlamp according to claim 11, wherein the sensor has an imaginary plane of symmetry coinciding with the imaginary plane of symmetry of the headlamp.

13. The motorcycle headlamp according to claim 1, wherein the light fixture contains light-emitting elements for a daytime running light, a cornering light, a dipped beam, an indicator and/or a full beam.

14. A motorcycle comprising the motorcycle headlamp according to claim 1.

15. A motorcycle headlamp comprises:
a carrier;
a light fixture mounted on the carrier; and
a sensor configured to detect features of an area lying in front of the motorcycle in the direction of travel; and
a supporting element to which the sensor is fastened, the supporting element being configured to be fastened to a housing of the motorcycle headlamp or to a frame of the motorcycle headlamp or to both to the housing and to the frame of the motorcycle headlamp,
wherein the carrier has an opening configured to allow the sensor to be arranged in the opening, and
wherein the supporting element is movably mounted relative to the carrier.

16. The motorcycle headlamp according to claim 15, wherein the sensor is fastened to the carrier.

17. The motorcycle headlamp according to claim 15, further comprising a supporting element to which the sensor is fastened, and the supporting element is configured to be fastened to the carrier or is formed as a component part of the carrier.

18. The motorcycle headlamp according to claim 15, wherein the carrier has two carrier legs and the opening is formed as a space between the carrier legs.

19. The motorcycle headlamp according to claim 15, wherein the carrier has an annular area which borders the opening.

20. The motorcycle headlamp according to claim 15, wherein the light fixture is one of a plurality of light fixtures mounted on the carrier, the carrier has a longitudinal direction and a bar-shaped section aligned in the longitudinal direction, and at least one of the plurality of light fixtures is mounted on the carrier on each side of the bar-shaped section.

21. The motorcycle headlamp according to claim 15, further comprising a cooling element to which the sensor is fastened.

22. The motorcycle headlamp according to claim 15, wherein the sensor is movably mounted relative to the carrier.

23. The motorcycle headlamp according to claim 15, further comprising a common cover for the sensor and the light fixture mounted on the carrier.

24. The motorcycle headlamp according to claim 15, wherein the motorcycle headlamp is formed to have at least one imaginary plane of symmetry, and wherein the sensor intersects the imaginary plane of symmetry.

25. The motorcycle headlamp according to claim 24, wherein the sensor has an imaginary plane of symmetry coinciding with the imaginary plane of symmetry of the headlamp.

26. The motorcycle headlamp according to claim 15, wherein the light fixture contains light-emitting elements for a daytime running light, a cornering light, a dipped beam, an indicator and/or a full beam.

27. A motorcycle comprising the motorcycle headlamp according to claim 15.

* * * * *